UNITED STATES PATENT OFFICE.

WILLIAM A. LEVERING, OF CHICAGO, ILLINOIS, ASSIGNOR TO THE STANDARD ASPHALT AND RUBBER COMPANY, OF CHICAGO, ILLINOIS, A CORPORATION OF NEW JERSEY.

PROCESS OF SEALING AND PROTECTING PERISHABLE PRODUCTS.

1,024,638.  Specification of Letters Patent.  Patented Apr. 30, 1912.

No Drawing.  Application filed September 8, 1911. Serial No. 648,332.

*To all whom it may concern:*

Be it known that I, WILLIAM A. LEVERING, residing at Chicago, in the county of Cook and State of Illinois, have invented certain new and useful Improvements in Processes of Sealing and Protecting Perishable Products, of which the following is a specification.

My invention relates to improved process for sealing and protecting perishable products, such as meats.

Meats, such as hams, are provided with coverings to prevent attacks by flies, insects or vermin and to protect them against impact and against moisture, acids or gases. In the past the usual method has been to test the meats, then cover them with a grease-proof paper which in turn is covered by a cotton loose-mesh cloth which is of a little looser mesh than ordinary cheese-cloth. This cloth is stretched securely over the meat and the exterior then coated with various materials, the principal ingredient of which has been glue. The objection to this method of packing is that glue is readily soluble in water and other liquids, and when placed in wet or moist spots will decay and very often mold, this being injurious to the contents. The glue coating is also affected by acid and gases. Also, when the glue is dry it is hard and brittle and is apt to crack, particularly upon impact. Furthermore, such glue coatings impart an undesirable taint or odor to the inclosed article. As a result of these defects much meat has been spoiled in shipment, particularly in export trade with Europe and other foreign countries. Many attempts have been made to find a suitable coating for the meat but with little success. The strict requirements of foreign countries with reference to the condition of American meats make it especially necessary to find a suitable covering.

I have discovered that the above defects may be obviated by covering the package with a bituminous or asphaltic coating. The meat or other product to be covered may be preliminarily treated in the same manner as heretofore, to-wit, by first covering it with grease-proof paper and then applying a covering of cotton cloth. The clothed product is then dipped in a heated bituminous substance, or otherwise covered with the same. When this coating is cooled and dried, it is preferably dusted with some powder to prevent sticking and to allow more ready handling of the package.

I have found that a bituminous product formed from air-blown petroleum residum is especially adapted for use in this connection. This bituminous product, which I use for the coating, may be formed in the manner described in Patents No. 635,429 and No. 635,430, issued to G. F. and G. C. K. Culmer. The product made in accordance with these patents is a solid or semi-solid asphaltic compound devoid of pitch and consisting of dehydrated and oxidized petroleum residuum which is chemically different from the original residuum, being higher in its asphaltene content and lower in its petrolene content than the residuum. It is known in fact as an air blown asphaltic residuum. It possesses properties materially different from those of natural asphalts or untreated petroleum residuum or compound of natural asphalts and petroleum residuums. The use of natural asphalts or untreated residuum is not satisfactory. The former is too brittle, and will not stand the disintegrating action of the weather. If sufficient liquid residuum is used to soften the natural asphalt to the proper degree then the compound will be lacking in consistency necessary in a proper coating for the purposes here in question.

The bituminous coating with which the package of meat is to be covered is first heated to about 325 to 350 degrees Fahrenheit, and the cloth coated package dipped therein. After cooling, the bituminous coating is dusted with talcum powder or a powder composed of talcum and lime-dust.

This process provides the package with an elastic coating which will readily withstand extremes of temperature, to-wit; it will not run when subjected to heat or crack in cold weather. It is also insect-proof and is insoluble in water, and is, moreover, unaffected by acids or gases, and will impart no odor or taste to the contents of the package. While a bituminous product made in accordance with the patent above cited is especially adapted for use in this connection, other bituminous products might perhaps be used if they complied with the conditions above specified.

The invention is not, therefore, limited to the exact coating except as specified in the appended claims.

I claim—

1. The process of protecting perishable products such as meats, which consists in first covering the product with a cloth or absorbent covering, then dipping or coating the covered product in an air blown asphaltic compound, formed from dehydrated and oxidized petroleum of a solid or semi-solid consistency and markedly higher in its content of asphaltene and lower in its petrolene content than the residuum from which said asphaltic compound is formed, then withdrawing the coated product, then allowing the coating to cool and then dusting the coating with powder composed of talcum and lime dust.

2. The process of protecting packages containing perishable products, such as foods, which consists in first covering the product with a cloth or absorbent cover, then applying a coating of air blown petroleum residuum which is first heated to a fluid or semi-fluid condition, said coating being formed from petroleum residuum which has been previously blasted with air for a considerable length of time until oxidized and dehydrated, so that such coating will retain its consistency and will not disintegrate or flow when subjected to extremes of weather conditions.

WILLIAM A. LEVERING.

Witnesses:
JOYCE M. LUTZ,
NELLIE B. DEARBORN.

---

Copies of this patent may be obtained for five cents each, by addressing the "Commissioner of Patents, Washington, D. C."